(12) United States Patent
Seo et al.

(10) Patent No.: US 11,113,368 B2
(45) Date of Patent: Sep. 7, 2021

(54) METHOD AND ELECTRONIC DEVICE FOR CONTROLLING PERMISSION OF APPLICATION PROGRAM

(71) Applicant: Samsung Electronics Co., Ltd., Gyeonggi-do (KR)

(72) Inventors: Dong-Wook Seo, Gyeonggi-do (KR); Seong-Hun Moon, Gyeonggi-do (KR); Moon-Kyung Kim, Gyeonggi-do (KR); Myeong-Jin Oh, Gyeonggi-do (KR); Se-Yeong Lee, Gyeonggi-do (KR); Da-Som Lee, Seoul (KR)

(73) Assignee: Samsung Electronics Co., Ltd

( * ) Notice: Subject to any disclaimer, the term of this patent is extended or adjusted under 35 U.S.C. 154(b) by 294 days.

(21) Appl. No.: 16/110,542

(22) Filed: Aug. 23, 2018

(65) Prior Publication Data
US 2019/0065711 A1 Feb. 28, 2019

(30) Foreign Application Priority Data

Aug. 23, 2017 (KR) ........................ 10-2017-0106440

(51) Int. Cl.
*G06F 21/31* (2013.01)
*G06F 9/451* (2018.01)
(Continued)

(52) U.S. Cl.
CPC .......... *G06F 21/31* (2013.01); *G06F 3/04886* (2013.01); *G06F 9/4411* (2013.01);
(Continued)

(58) Field of Classification Search
CPC ...... G06F 21/31; G06F 9/451; G06F 3/04886; G06F 9/4411; G06F 21/10; G06F 21/44; G06F 21/604
See application file for complete search history.

(56) References Cited

U.S. PATENT DOCUMENTS

| 9,147,066 B1* | 9/2015 | Tian ...................... G06F 21/572 |
| 9,330,254 B1* | 5/2016 | Xue ....................... G06F 21/554 |

(Continued)

FOREIGN PATENT DOCUMENTS

| EP | 2 562 667 | 2/2013 |
| EP | 3 295 363 | 3/2018 |

(Continued)

OTHER PUBLICATIONS

William Enck et al., Understanding Android Security, IEEE Security & Privacy (Year: 2009).*

(Continued)

*Primary Examiner* — Shanto Abedin
(74) *Attorney, Agent, or Firm* — The Farrell Law Firm, P.C.

(57) ABSTRACT

An electronic device is provided. The electronic device includes a housing, a touchscreen display, a wireless communication circuit, a processor electrically connected to the touchscreen display and the wireless communication circuit, and a memory electrically connected to the processor, wherein the memory is configured to store an application program comprising a user interface, and store an instruction that, when executed, enables the processor to store a permission for accessing, by an application program stored in the memory, at least one among hardware components or software components of the electronic device, activate the application program, allow the application program to access the at least one among hardware components or software components based on the stored permission and display a user interface (UI) of the application program on the touchscreen display, hide a part of the user interface while the application program is executed in a background state, and monitor whether the application program uses the at least one among hardware components or software com- (Continued)

ponents while the application program is executed in the background state.

16 Claims, 12 Drawing Sheets

(51) Int. Cl.
*G06F 21/60* (2013.01)
*G06F 3/0484* (2013.01)
*G06F 3/0482* (2013.01)
*G06F 3/0488* (2013.01)
*G06F 21/44* (2013.01)
*G06F 21/10* (2013.01)
*G06F 9/4401* (2018.01)

(52) U.S. Cl.
CPC .............. *G06F 9/451* (2018.02); *G06F 21/10* (2013.01); *G06F 21/44* (2013.01); *G06F 21/604* (2013.01); *G06F 3/0482* (2013.01); *G06F 3/04847* (2013.01)

(56) References Cited

U.S. PATENT DOCUMENTS

| | | | | |
|---|---|---|---|---|
| 9,659,182 | B1* | 5/2017 | Roundy | G06F 21/6281 |
| 2005/0120242 | A1* | 6/2005 | Mayer | G06F 21/56 |
| | | | | 726/4 |
| 2005/0204125 | A1* | 9/2005 | Chin | G06F 9/4411 |
| | | | | 713/100 |
| 2007/0239983 | A1* | 10/2007 | Shlomai | G06F 21/53 |
| | | | | 713/166 |
| 2013/0055378 | A1 | 2/2013 | Chang et al. | |
| 2013/0196649 | A1 | 8/2013 | Paddon et al. | |
| 2014/0059695 | A1* | 2/2014 | Parecki | H04L 63/102 |
| | | | | 726/26 |
| 2016/0080320 | A1* | 3/2016 | Barakat | H04L 63/20 |
| | | | | 726/4 |
| 2016/0119358 | A1* | 4/2016 | Laadan | H04L 63/102 |
| | | | | 726/28 |
| 2016/0191534 | A1* | 6/2016 | Mallozzi | G06F 21/629 |
| | | | | 726/4 |
| 2016/0205103 | A1 | 7/2016 | Lee et al. | |
| 2016/0353237 | A1* | 12/2016 | Shepherd | H04W 4/02 |
| 2017/0118611 | A1* | 4/2017 | Schieman | H04L 43/045 |
| 2017/0330248 | A1* | 11/2017 | Gomariz | G06Q 30/0272 |
| 2018/0321970 | A1* | 11/2018 | Cortes | G06F 9/4843 |
| 2018/0322313 | A1* | 11/2018 | Yao | H04L 9/3263 |

FOREIGN PATENT DOCUMENTS

| | | |
|---|---|---|
| JP | 2013-246465 | 12/2013 |
| KR | 1020160087731 | 7/2016 |
| KR | 1020160131886 | 11/2016 |
| WO | WO 2016/182272 | 11/2016 |

OTHER PUBLICATIONS

European Search Report dated Feb. 28, 2020 issued in counterpart application No. 18847826.7-1231, 9 pages.
International Search Report dated Nov. 13, 2018 issued in counterpart application No. PCT/KR2018/009683, 10 pages.

* cited by examiner

| PERMISSION DATABASE | | | | | | |
|---|---|---|---|---|---|---|
| | | PERMISSION USAGE (PERMISSION USAGE) | | | | |
| APPLICATION X | | 1 | 2 | 3 | 4 | 5 |
| | ACTIVITY A | O | O | O | | |
| | ACTIVITY B | O | O | | | O |
| | ACTIVITY C | | | O | O | O |

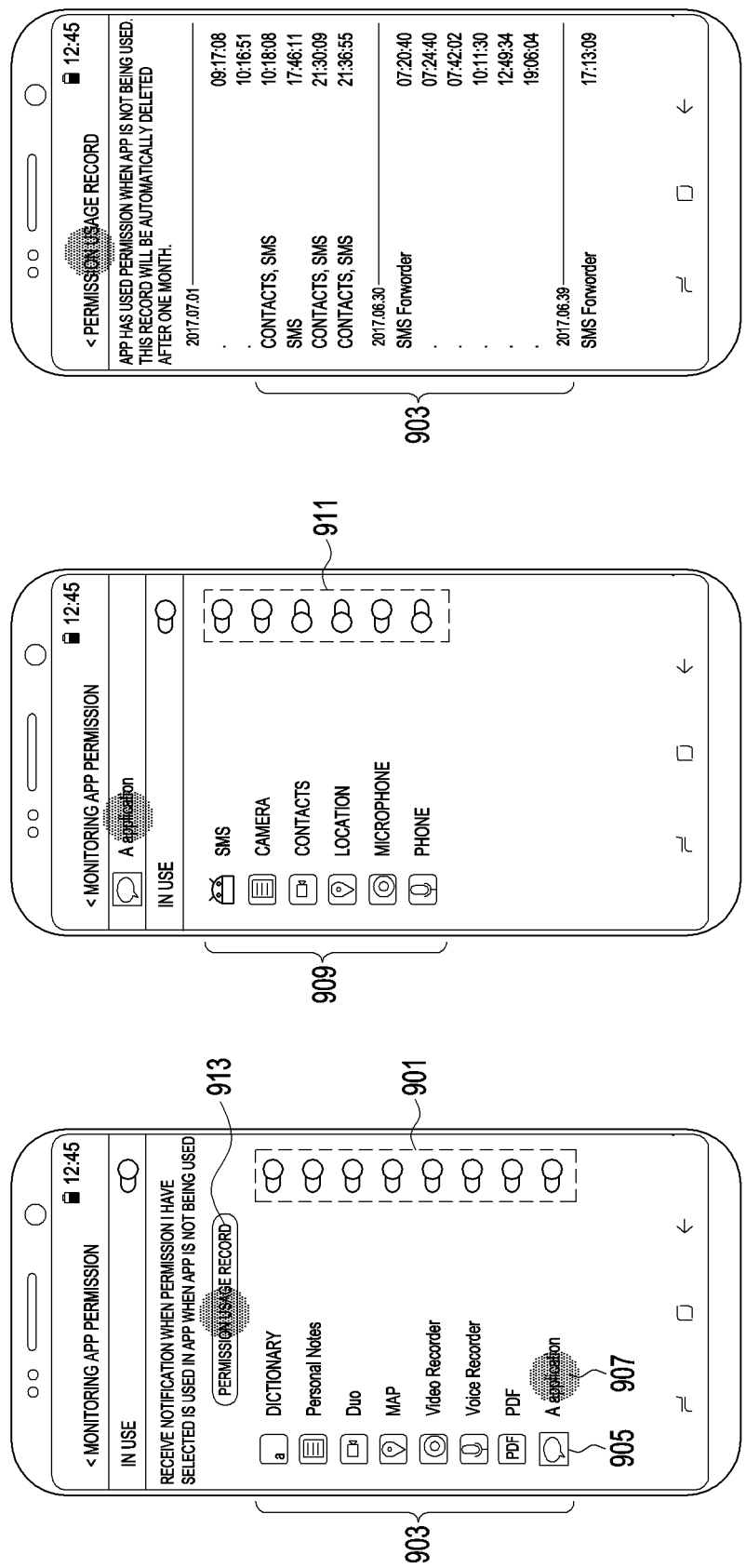

METHOD AND ELECTRONIC DEVICE FOR CONTROLLING PERMISSION OF APPLICATION PROGRAM

CROSS-REFERENCE TO RELATED APPLICATION(S)

This application is based on and claims priority under 35 U.S.C. § 119(a) to Korean Patent Application Serial No. 10-2017-0106440, which was filed in the Korean Intellectual Property Office on Aug. 23, 2017, the entire content of which is hereby incorporated by reference.

BACKGROUND

1. Field

The disclosure relates, generally, to an electronic device, and more particularly, to a method and electronic device for controlling the permission of an application program.

2. Description of the Related Art

A user of an electronic device may download and install a desired application program (application or app) through an application market, an app store, and various internet sites.

A maker (or provider) of an application may request permission from a user for accessing at least one hardware component or software component of the electronic device and for performing a particular function at a time point at which the corresponding application is downloaded and installed or initially executed. The application may be given various permissions only when the corresponding request is accepted, and the user may choose various permissions to accept the corresponding request.

When the user accepts the request for such permission, the corresponding application may already have the permission while being executed in the foreground state. However, the user may have difficulty controlling the permission while the application is executed in the background state. For example, when the application is executed in the background state, regardless of the user's intent or needs, the application may still access the at least one hardware component or software component of the electronic device.

SUMMARY

The disclosure has been made to address at least the disadvantages described above and to provide at least the advantages described below. Accordingly, an aspect of the disclosure provides a method and electronic device for controlling the permission of an application when the application is executed in the background state of the electronic device.

In accordance with an aspect of the disclosure, there is provided an electronic device. The electronic device includes a housing, a touchscreen display, a wireless communication circuit, a processor electrically connected to the touchscreen display and the wireless communication circuit, and a memory electrically connected to the processor, wherein the memory is configured to store an application program comprising a user interface, and store an instruction that, when executed, enables the processor to: store a permission for accessing, by an application program stored in the memory, at least one among hardware components or software components of the electronic device, activate the application program, allow the application program to access the at least one among hardware components or software components based on the stored permission and display a user interface (UI) of the application program on the touchscreen display, hide a part of the user interface while the application program is executed in a background state, and monitor whether the application program uses the at least one among hardware components or software components while the application program is executed in the background state.

In accordance with an aspect of the disclosure, there is provided a method for controlling a permission of an application program of an electronic device. The method includes storing a permission for accessing, by the application program, at least one among hardware components or software components of the electronic device, activating the application program, allowing the application program to access the at least one among hardware components or software components based on the stored permission and displaying a user interface (UI) of the application program on a touchscreen display of the electronic device, hiding at least a part of the user interface while the application program is executed in a background state, and monitoring whether the application program uses the at least one among hardware components or software components while the application program is executed in the background state.

In accordance with an aspect of the disclosure, there is provided a non-transitory computer readable storage medium including a plurality of instructions that when executed perform a method for controlling a permission of an application program of an electronic device. The method includes storing a permission for accessing, by the application program, at least one among hardware components or software components of the electronic device, activating the application program, allowing the application program to access the at least one among hardware components or software components based on the stored permission and displaying a user interface (UI) of the application program on a touchscreen display of the electronic device, hiding at least a part of the user interface while the application program is executed in a background state, and monitoring whether the application program uses the at least one among hardware components or software components while the application program is executed in the background state.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 9A-9C are diagrams of a user interface through which an electronic device is configured to allow an application to provide a user with a notification, according to an embodiment;

DETAILED DESCRIPTION

Figure 1:
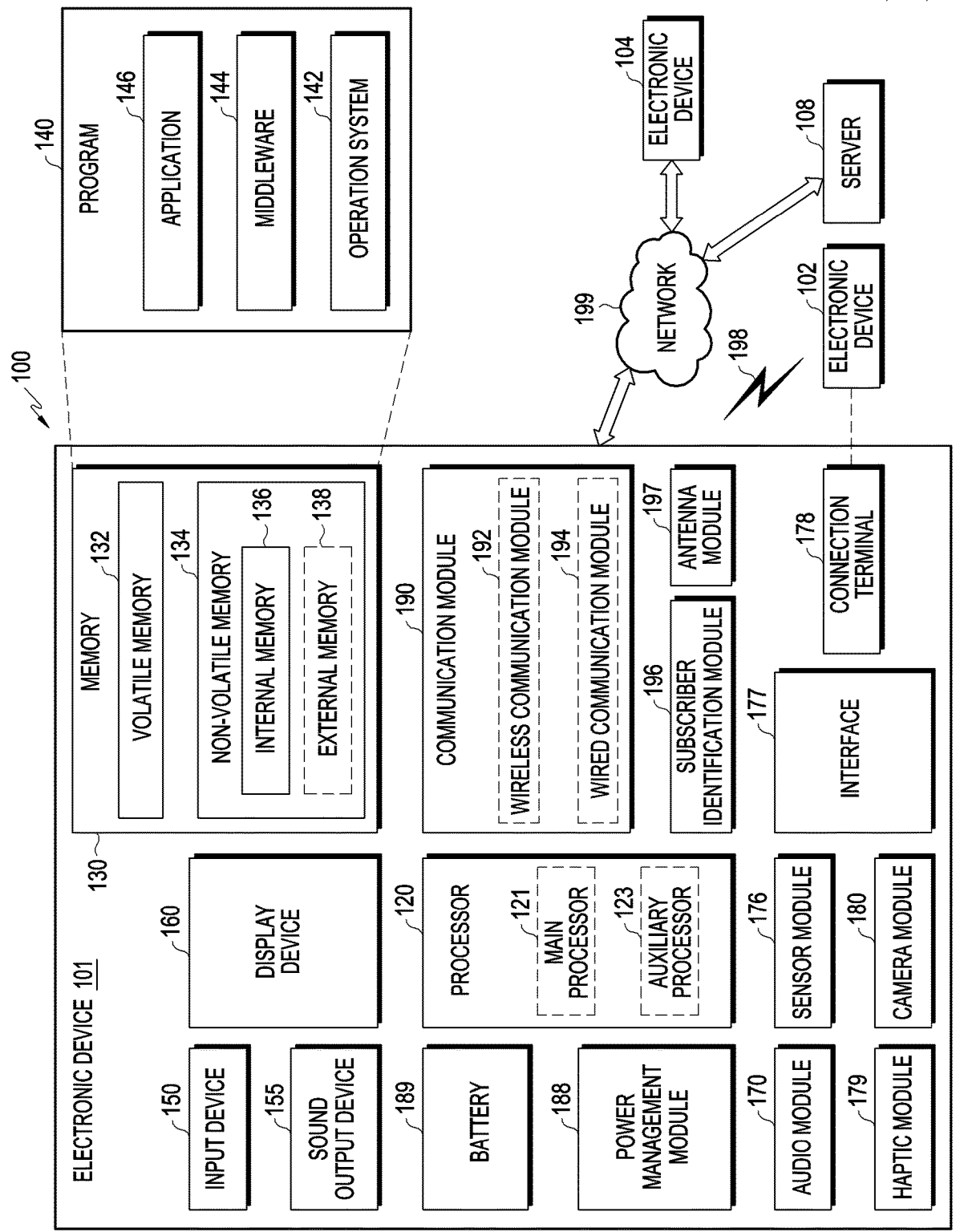
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PPM), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device 101 in a network environment 100, according to an embodiment. Referring to FIG. 1, the electronic device 101 in the network environment 100 may communicate with an electronic device 102 through a first network 198 (e.g. short-range wireless communication), or may communicate with an electronic device 104 or a server 108 through a second network 199 (e.g. long-range wireless communication). The electronic device 101 may also communicate with the electronic device 104 through the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one (e.g. the display device 160 or the camera module 180) among the elements may be omitted from the electronic device 101 or another element may be added thereto. Some elements may be integrally implemented like the sensor module 176 (e.g. a fingerprint sensor, an iris sensor, or an illuminance sensor) embedded in the display device 160 (e.g. a display).

The processor 120 may drive software (e.g. a program 140) to control at least one different element (e.g. hardware or software element) of the electronic device 101 connected to the processor 120, and may variously process and calculate data. The processor 120 may load and process command or data received from another element (e.g. the sensor module 176 or the communication module 190) on a volatile memory 132, and may store resultant data in a non-volatile memory 134. The processor 120 may include a main processor 121 (e.g. a central processing unit (CPU) or an application processor (AP)), and an auxiliary processor 123 (e.g. a graphic processor unit (GPU), an image signal processor (ISP), a sensor hub processor, or a communication processor (CP)) that operates independently therefrom, and additionally or alternatively, uses power lower than that of the main processor 121, or specializes in a designated function. The auxiliary processor 123 may operate separately from the main processor 121 or when the auxiliary processor 123 has been embedded in the main processor 121.

The auxiliary processor 123 may control at least some of states or functions related to at least one element (e.g. the display device 160, the sensor module 176, or the communication module 190) among the elements of the electronic device 101, on behalf of the main processor 121 while the main processor 121 is in an inactive (e.g. sleep) state, or together with the main processor 121 while the main processor 121 is in an active (e.g. performing an application) state. The auxiliary processor 123 (e.g. an ISP or a CP) may be implemented as a partial element of another element (e.g. the camera module 180 or the communication module 190) functionally related thereto. The memory 130 may store various pieces of data (e.g. software (e.g. the program 140) and input data or output data about a command relating to the software) used by at least one element (e.g. the processor 120 or the sensor module 176) of the electronic device 101. The memory 130 may include the volatile memory 132 or the non-volatile memory 134.

The program 140 is software stored in the memory 130 and may include an operating system (OS) 142, middleware 144, or an application 146.

The input device 150 is a device configured to receive a command or data to be used in an element (e.g. the processor 120) of the electronic device 101 from the outside (e.g. a user) of the electronic device 101 and may include a microphone, a mouse, or a keyboard.

The sound output device 155 is a device configured to output a sound signal to the outside of the electronic device 101 and may include a speaker used for common use, such as multimedia content reproduction or recording reproduction, and a receiver used for only phone call reception. The receiver may be arranged integrally with the speaker or separately therefrom.

The display device 160 is a device configured to visually provide a user of the electronic device 101 with information and may include a display, a hologram device, or a projector, and a control circuit configured to control the corresponding device. The display device 160 may include a touch circuit (touch circuitry) or a pressure sensor configured to measure the pressure intensity of a touch.

The audio module 170 may bilaterally convert sound and an electronic signal, and the audio module 170 may acquire sound through the input device 150 or may output sound through the sound output device 155 or the electronic device 102 (e.g. speaker or headphone) connected with the electronic device 101 by wire or wirelessly.

The sensor module 176 may generate an electrical signal or a data value corresponding to the internal operation state (e.g. power or temperature) or the external environment state of the electronic device 101. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support a designated protocol allowing wireless or wired connection with the electronic device 102. The interface 177 may include a high definition multimedia interface (HDMI), a universal serial bus (USB) interface, a secure digital (SD) card interface, or an audio interface.

A connection terminal 178 may include a connecter an HDMI connector, a USB connector, an SD card connector, or an audio connector (e.g. headphone connector), that can physically connect the electronic device 101 and the electronic device 102.

The haptic module 179 may convert an electronic signal into an electrical stimulus or a mechanical stimulus (e.g. vibration or movement) that a user can recognize through haptic or kinetic sensation. The haptic module 179 may include a motor, a piezoelectric element, or an electrical stimulation device.

The camera module 180 may photograph a still image and a moving image. The camera module 180 may include at least one lens, an image sensor, an ISP, or a flash.

The power management module 188 is a module configured to manage power supplied to the electronic device 101 and may be configured as at least a part of a power management integrated circuit (PMIC).

The battery 189 is a device configured to supply power to at least one element of the electronic device 101 and may include a non-rechargeable primary battery, a rechargeable secondary battery, or other type of battery.

The communication module 190 may support establishment of a wired or wireless communication channel between the electronic device 101 and the electronic device 102, the electronic device 104, or the server 108 and communication through the established communication channel. The communication module 190 may include at least one communication processor that supports wired communication or wireless communication and operates independently from the processor 120 (e.g. an AP). The communication module 190 may include a wireless communication module 192 (e.g. a cellular communication module, a short-range wireless communication module, or a global navigation satellite system (GNSS) communication module) or a wired communication module 194 (e.g. a local area network (LAN) communication module or a power line communication module) and may communicate with an external electronic device through the first network 198 (e.g. a short-range communication network, such as BT, wireless-fidelity (Wi-Fi) direct or infrared data association (IrDA)) or a second network 199 (e.g. a long-range communication network, such as a cellular network, internet, or a computer network (e.g. LAN or wide area network (WAN)), by using a corresponding communication module among the communication modules. The various kinds of communication modules 190 as described above may be implemented by a system on chip (SoC), a single chip or respective separate chips.

The wireless communication module 192 may use user information stored in the SIM 196 to distinguish and authenticate the electronic device 101 in a communication network.

The antenna module 197 may include at least one antenna configured to receive or transmit a signal or power from or to the outside. The communication module 190 (e.g. the wireless communication module 192) may transmit or receive a signal to or from an external electronic device through an antenna suitable for a communication scheme.

Some elements among the above elements are connected to each other through an inter-peripheral device communication scheme (e.g. a bus, general purpose input/output (GPIO), a serial peripheral interface (SPI), or a mobile industry processor interface (MIPI)) and thus may exchange a signal (e.g. command or data) with each other.

A command or data may be transmitted or received between the electronic device 101 and the external electronic device 104 through the server 108 connected to the second network 199. Each of the electronic devices 102 and 104 may be a device having a type identical to or different from the type of the electronic device 101. All or some of operations executed in the electronic device 101 may be executed in another external electronic device or a plurality of external electronic devices. When the electronic device 101 should perform a function or a service automatically or by a request, the electronic device 101 may request an external electronic device to perform at least some functions associated therewith, instead of or in addition to executing the function or the service by itself. The external electronic device that has received the request may perform the requested function or additional functions, and transfer the result therefrom to the electronic device 101. The electronic device 101 may provide the requested function or service by processing the received result as it is or additionally. To this end, cloud computing, distributed computing, or client-server computing technology may be used.

Figure 2:
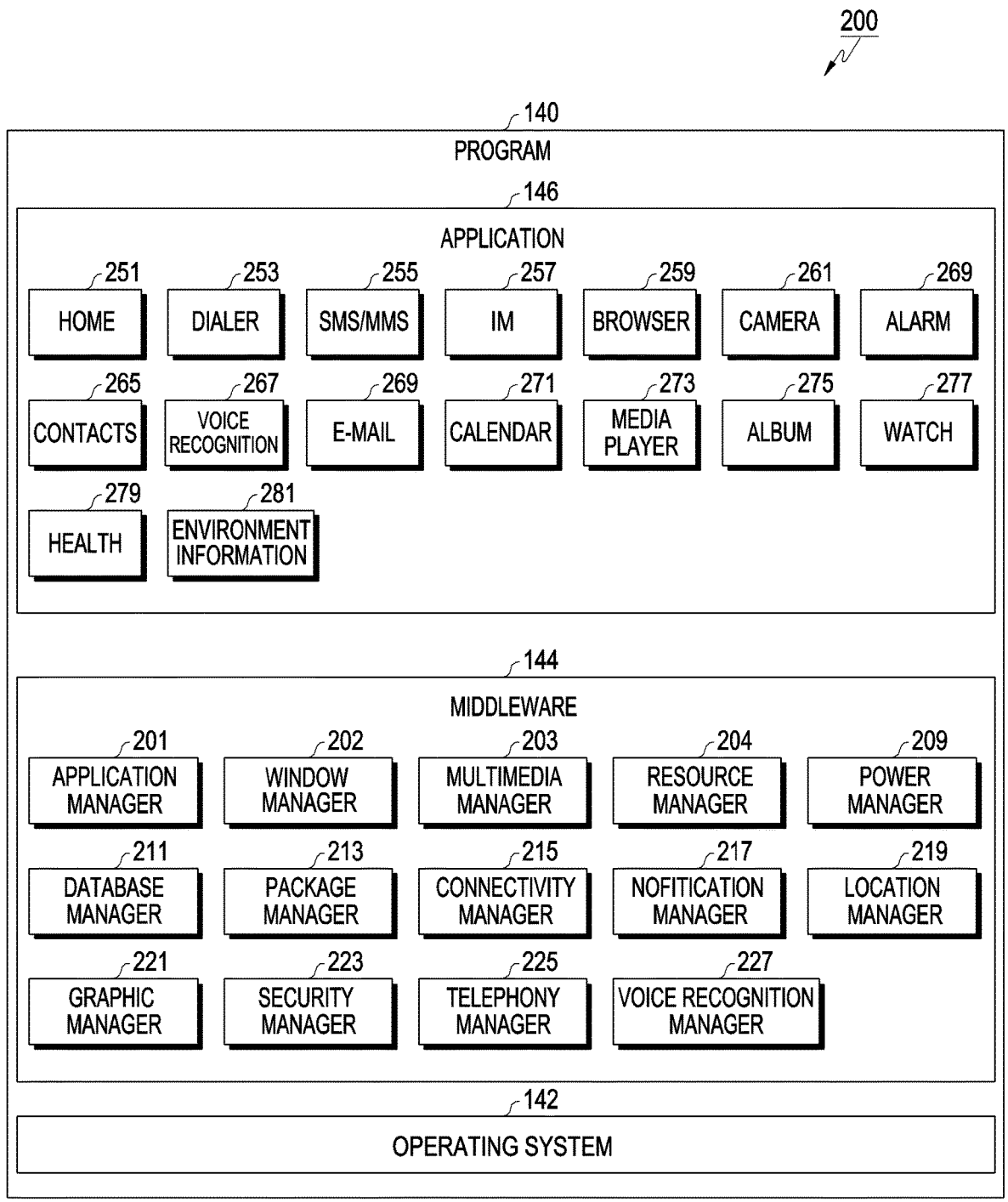
FIG. 2 is a diagram of a program, according to an embodiment.

FIG. 2 is a diagram of the program 140, according to an embodiment. The program 140 may include the OS 142 configured to control at least one resource or module of the electronic device 101, the middleware 144, or the application 146 executable in the operation system 142. The OS 142 may include Android™, iOS™, Windows™, Symbian™, Tizen™, or Bada™. At least some programs of the program 140 may be pre-loaded in the electronic device 101 in manufacturing, or may be updated and downloaded from the electronic device 102 or 104 or the server 108 in a use environment for a user.

The OS 142 may control (e.g. allocate or retrieve) a system resource (e.g. process, memory, or power) of the electronic device 101. The OS 142 may additionally or alternatively include at least one driver program configured to drive another hardware device of the electronic device 101, e.g., the input device 150, the sound output device 155, the display device 160, the audio module 170, the sensor module 176, the interface 177, the haptic module 179, the camera module 180, the power management module 188, the battery 189, the communication module 190, the SIM 196, or the antenna module 197.

The middleware 144 may provide the application 146 with various functions in order to allow the application 146 to use a function or information provided by at least one resource of the electronic device 101. The middleware 144 may include an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201 may manage the life cycles of the applications 146. The window manager 203 may manage a graphic user interface (GUI) resource used on a screen. The multimedia manager 205 may identify formats required for reproducing various media files and encode or decode a media file using a codec suitable for the corresponding format. The resource manager 207 may manage the space of a memory or a source code of the application 146. The power manager 209 may manage battery capacity, temperature, or power, and may determine or provide power information required for the operation of the electronic device 101 based on corresponding information. The power manager 209 may operate in conjunction with a basic input/output system (BIOS).

The database manager 211 may generate, search, or change databases to be used by the applications 146. The package manager 213 may manage the installation and updating of an application distributed in a type of package file. The connectivity manager 215 may manage wireless or wired connection between the electronic device 101 and an external electronic device. The notification manager 217 may provide a function for notifying a user of an occurred event (e.g. phone call, message, or alarm). The location manager 219 may manage location information of the electronic device 101. The graphic manager 221 may manage a graphic effect to be provided to a user and a user interface relating to the graphic effect. The security manager 223 may provide system security or user authentication. The telephony manager 225 may manage a voice call or video call function of the electronic device 101. The voice recognition manager 227 may transmit voice data of a user to the server 108 and receive an instruction (command) corresponding to a function to be performed in the electronic device 101 base on the corresponding voice data or character data converted on the basis of the corresponding voice data. The middleware 244 may dynamically delete some of the existing elements or add new elements. At least a part of the middleware 144 may be included as a part of the OS 142 or may be implemented as software separate from the OS 142.

The application 146 may include applications relating to a home application 251, a dialer application 253, an SMS/MMS application 255, an instant messaging (IM) application 257, a browser application 259, a camera application 261, an alarm application 263, a contacts application 265, a voice recognition application 267, an e-mail application 269, a calendar application 271, a media player application 273, an album application 275, a watch application 277, a health application 279 (e.g., for measuring exercise quantity or blood glucose), or environment information 281 (e.g., atmospheric pressure, humidity, or temperature information).

The application 146 may further include an information exchange application that can support information exchange between the electronic device 101 and an external electronic device. The information exchange application may include a notification relay application configured to transfer designated information (e.g. phone call, message, or alarm) to an external electronic device or a device management application configured to manage an external electronic device. The notification relay application may transfer notification information corresponding to an event (e.g. e-mail reception) occurring in another application (e.g. the e-mail application 269) of the electronic device 101 to an external electronic device, or receive notification information from an external electronic device to provide a user of the electronic device 101 with the information. The device management application may control power (e.g. turn-on or turn-off) or a function (e.g. the brightness, resolution, or focus of the display device 160 or the camera module 180) of an external electronic device communicating with the electronic device 101, or some elements (e.g. the display device 160 or the camera module 180) thereof. The device management application may additionally or alternatively support the installation, deleting, or updating of an application operating in an external electronic device.

Figure 3:
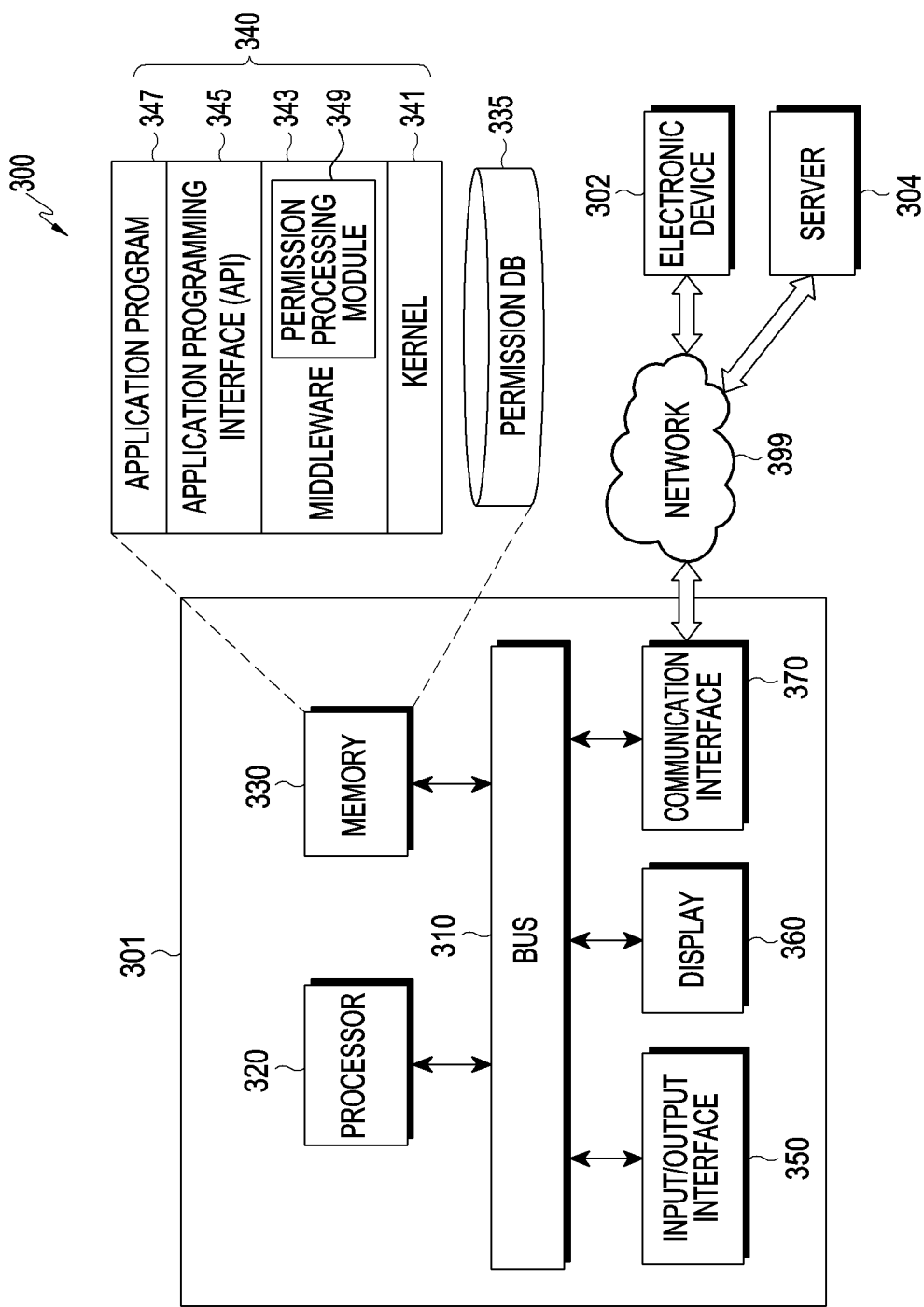
FIG. 3 is a diagram of a program module, according to an embodiment.

FIG. 3 is a diagram of a program module, according to an embodiment. An electronic device 301 may include some or all of the components of the electronic device 101 of FIG. 1. For example, the electronic device 301 may include a bus 310, a processor 320, a memory 330, an input/output interface 350, a display 360, and a communication interface 370.

The bus 310 may include a circuit that interconnects the elements 320 to 370 and transmits communication (e.g., control messages or data) between the elements.

The processor 320 may carry out calculations or data processing relating to the control and/or communication of at least one other element of the electronic device 301.

The memory 330 may include a volatile and/or non-volatile memory. The memory 330 may store commands or data relevant to at least one other element of the electronic device 301.

The memory 330 may include a permission (permission) database 335. The permission database 335 may store at least one allowed permission, which each of the applications 347 of the electronic device 301, and information relating thereto. The permission database 335 may be used as a reference when an application 347 is executed, and the permission of the application 347 may be configured depending on stored information.

The permission may imply a permission for accessing at least one among hardware components or software components of the electronic device 301 by the application 347. For example, the permission may imply a credential for enabling access to particular data of the electronic device 301 or enabling performing of a particular function.

The stored information may include state information of each of the applications 347. The state information of each of the applications 347 may include information relating to whether the state (execution state or operation state) of each of the applications 347 corresponds to a foreground state or a background state. The foreground state corresponds to a state where the execution screen of an application currently executed in the electronic device 301 is displayed on the display of the electronic device 301, and may correspond to a state where a user can see the execution screen and can manipulate a particular button displayed on the execution screen. The foreground state may correspond to the state of an application, in which the execution screen, such as a UI of the application, is being presented on the display of the electronic device 301. The background state may correspond to a state where an application is currently being executed in the electronic device 301, but the execution screen thereof is not presented on the display.

The memory 330 may store software and/or a program 340. The program 340 may include a kernel 341, a middleware 343, an application programming interface (API) 345, and/or the applications 347. At least some of the kernel 341, the middleware 343, and the API 345 may be referred to as an OS. The kernel 341 may control or manage system resources (e.g., the bus 310, the processor 320, or the memory 330) used for executing an operation or function implemented by other programs (e.g., the middleware 343, the API 345, or the applications 347). Furthermore, the kernel 341 may provide an interface through which the middleware 343, the API 345, or the applications 347 may access the individual elements of the electronic device 301 to control or manage the system resources.

The middleware 343 may function as an intermediary for allowing the API 345 or the applications 347 to communicate with the kernel 341 to exchange data. Furthermore, the middleware 343 may process one or more task requests, which are received from the applications 347, according to priorities thereof. For example, the middleware 343 may assign priorities for using the system resources (e.g., the bus 310, the processor 320, the memory 330, or the like) of the electronic device 301 to one or more of the applications 347, and may process the one or more task requests.

The middleware 343 may include a permission processing module 349. The permission processing module 349 may configure and manage the permission of each of the applications. When permission information is included in the setup file of an application, when the application is installed, the permission processing module 349 may configure the permission of the application according to the permission information. When permission information according to the state information of an application is included, the permission processing module 349 may differently configure the permission of the application depending on the state of the application. The permission processing module 349 may differently configure the permission of an application depending on whether the state information of the application corresponds to a foreground state or a background state.

The API 345 is an interface used by the applications 347 to control a function provided from the kernel 341 or the middleware 343, and may include at least one interface or function (e.g., an instruction) for a file control, a window control, image processing, a character control, or the like.

The input/output interface 350 may forward commands or data, input from a user or an external device, to the other element(s) of the electronic device 301, or may output commands or data, received from the other element(s) of the electronic device 301, to the user or the external device.

The display 360 may include a liquid crystal display (LCD), a light emitting diode (LED) display, an organic light emitting diode (OLED) display, a micro electro mechanical system (MEMS) display, or an electronic paper display. The display 360 may display various types of content (e.g., text, images, videos, icons, and/or symbols) for a user. The display 360 may include a touch screen and may receive a touch, gesture, proximity, or hovering input using an electronic pen or the user's body part.

The communication interface 370 may configure the communication between the electronic device 301 and the external electronic device 302 or the server 304. The communication interface 370 may be connected to a network 362 (through wireless communication or wired communication and thus may communicate with an external device.

The permission processing module 349 is included in the middleware 343. However, the permission processing module 349 may be included in the processor 320 or the processor 320 may execute the operation of the permission processing module 349.

An electronic device (e.g. the electronic device 101) may include: a housing; a touchscreen display (e.g. the display device 160) exposed to a part of the housing; a wireless communication circuit (e.g. the communication module 190) located in the housing; a processor (e.g. the processor 120) electrically connected to the touchscreen display and the wireless communication circuit; and a memory (e.g. the memory 130) electrically connected to the processor, wherein the memory is configured to store an application program (e.g. the application 146) including a user interface, and the application program may include a command allowing, when the application program is executed, the processor to: store a permission (permission) for accessing, by the application program, at least one among hardware components (e.g. the processor 120, the memory 130, the input device 150, the sound output device 155, the display device 160, the audio module 170, the sensor module 176, the interface 177, the haptic module 179, the camera module 180, the power management module 188, the battery 189, the communication module 190, the subscriber identification module 196, and the antenna module 197) or software components (e.g. the application 146 and data stored in the memory 130) of the electronic device; activate the application program; allow the application program to access the at least one among the hardware components or software components on the basis of the permission and display the user interface on the touchscreen display; hide at least a part of the user interface while the application program is executed in a background state; and monitor whether the application program uses the at least one among the hardware components or software components while the application program is executed in the background state.

The command may include allowing the processor to provide, through the touchscreen display, a notification when the application program uses at least one among the hardware components or the software components while the application program is executed in the background state.

The command may allow the processor to provide a configuration User Interface (UI) for configuration to the touchscreen display, and the configuration user interface may include a list of application programs each having at least one button selecting whether the notification is provided.

The configuration user interface may further include a button configured to provide a history in which the application program uses at least one among the hardware components or the software components within a designated period while the application program is executed in the background state, and the command may include allowing the processor to, when a user input for the button is received, provide the history on the touchscreen display.

A user input may be received through the list of the application programs, and when a user input for at least one among the application programs in the list is received, a list of hardware components or software components each including at least one button enabling the selection of the permission may be displayed.

The command may further include allowing the processor to transmit the notification to an external electronic device by using the wireless communication circuit.

The command may include allowing the processor to, when the application program is installed or executed, store the permission.

The command may further include allowing the processor to restrict the application program from accessing at least one among the hardware components or software components of the electronic device while the application program is executed in the background state.

The command may further include allowing the processor to restrict the application program from accessing at least one among the hardware components or software components of the electronic device on the basis of a predetermined permission level while the application program is executed in the background state.

The command may further include allowing the processor to allow the application program to access at least one among hardware components or software components of the electronic device, which are used in a designated activity of the application program, while the application program is executed in the background state.

The designated activity may include an activity immediately before the application program is converted from the foreground state to the background state.

The command may further include allowing the processor to, when at least two components among the hardware components or the software components of the electronic device operate in association with each other, restrict the application program from accessing the at least two components among the hardware components or the software components of the electronic device while the application program is executed in the background state.

The command may further include allowing the processor to provide the application program with predetermined data or randomly generated data when the application program accesses at least one among the hardware components or the software components while the application program is executed in the background state.

Figure 4A:
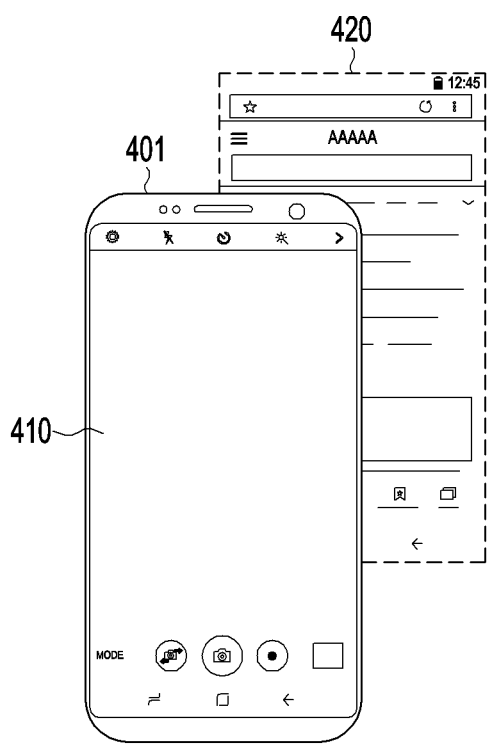
FIGS. 4A and 4B are diagrams of an operation for determining state information of an application of an electronic device, according to an embodiment.
Figure 4B:
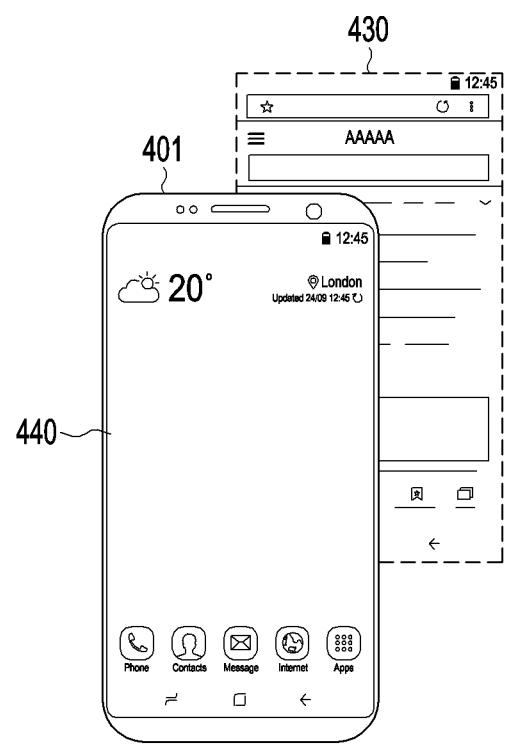

The memory may further include distinctively storing a function provided when the application program is executed in the foreground state and a function provided when the application program is executed in the background state. FIGS. 4A and 4B are diagrams for determining state information of an application of an electronic device 401, according to an embodiment.

Referring to FIGS. 4A and 4B, the electronic device 401 may determine whether the state of an application corresponds to a foreground state or a background state.

The electronic device 401 may execute a first application and a second application. As shown in FIG. 4A, when the electronic device 401 displays an execution screen 410 of the first application on a display and hides (does not display) an execution screen 420 of the second application so as not to be seen, the electronic device 401 may determine the state information of the first application to be a foreground state, and the state information of the second application to be a background state.

The electronic device 401 may execute a first application. As shown in FIG. 4B, when the electronic device 401 displays a home screen 440 on the display and hides an execution screen 430 of the first application so as not to be seen, the electronic device 401 may determine the state information of the first application to be a background state.

An application which has been in the foreground state in the electronic device 401 may be changed to be in the background state by a user inputting a user manipulation for using another application or inputting a user manipulation for screen conversion into the home screen of the electronic device.

An application which has been in the foreground state in the electronic device may be changed to be in an end (kill) state by the input of a user manipulation, such as pressing an end button of the application. The end state is a state where the process of the application is ended (killed), and may be a state where executing of all operations of the application has been terminated, such as the state where the execution screen of the application is not displayed.

The background state may be a state where the execution screen of an application is not seen on the display, but the process of the application is being executed, not ended (killed).

Figure 5:
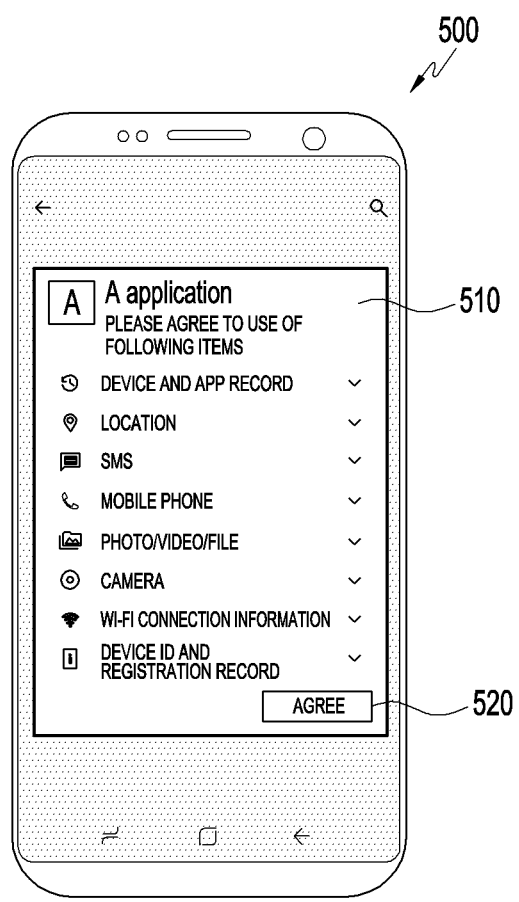
FIG. 5 is a diagram of a screen in which an electronic device requests user consent to allow an application to use components of the electronic device, according to an embodiment.

FIG. 5 is a diagram of a screen in which an electronic device 500 requests user consent to allow an application (e.g. the application 146) to use components of the electronic device, according to an embodiment. During the installation (or downloading) of the application, the electronic device 500 may receive, from the application, a request for consent to a permission for allowing the application to access hardware components or software components of the electronic device 500. When the electronic device 500 installs the application, the electronic device 500 may display a screen requesting user consent such that the application can use hardware components or software components of the electronic device 500. When a user input for the installation of an application is received, the electronic device 500 may display a screen 510. The components may include device and app records, location, SMS, mobile phone, photo/video/file, camera, Wi-Fi connection information, and/or device ID and communication records.

When the installed (or downloaded) application is initially executed, the electronic device 500 may display a screen requesting user consent such that the components of the electronic device 500 can be accessed and used by the corresponding application.

Figure 6:
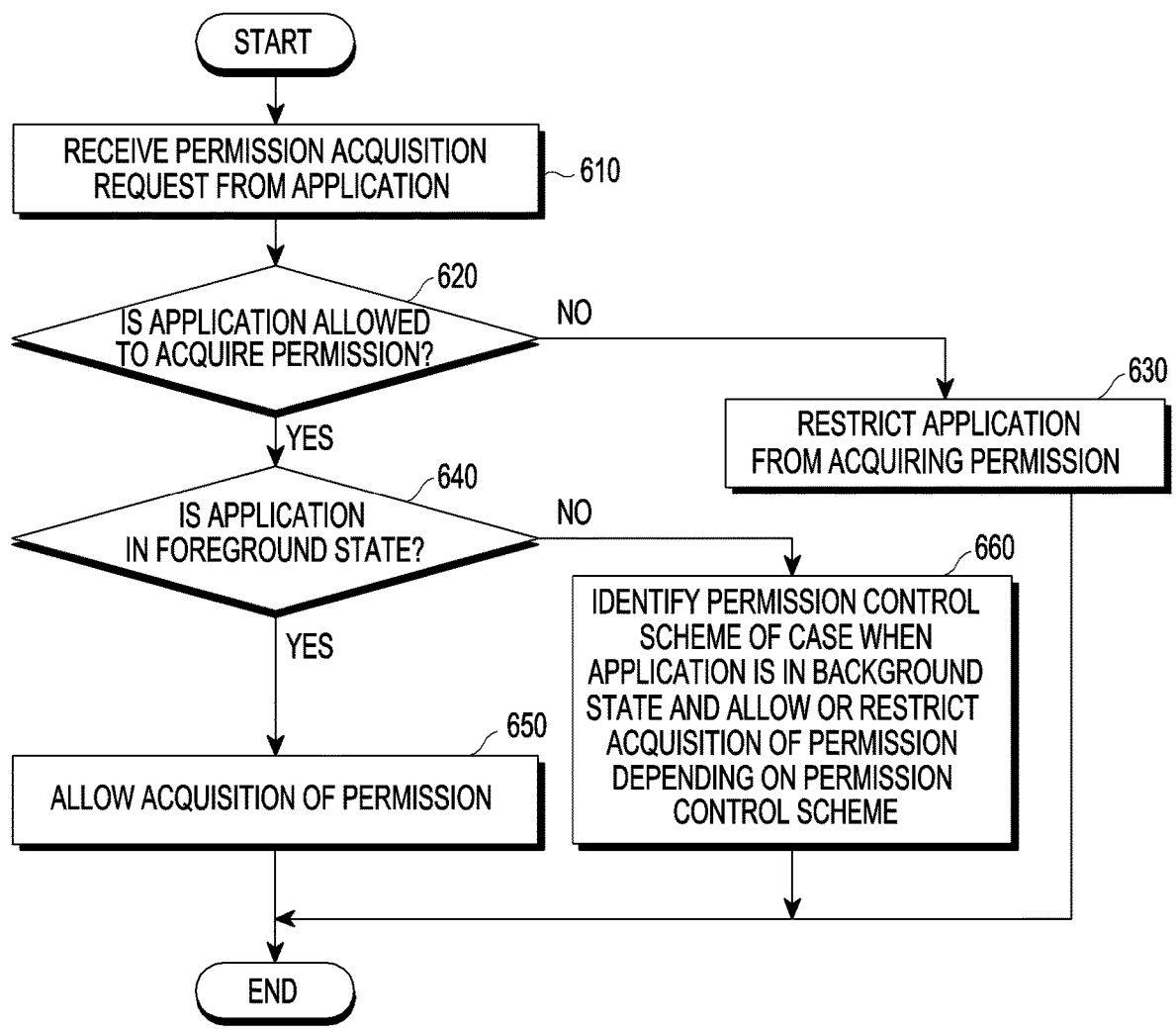
FIG. 6 is a flowchart of a method of an electronic device, which allows acquisition of the permission, according to an embodiment.

FIG. 6 is a flowchart of a method of an electronic device (e.g. the electronic device 500), which allows acquisition of the permission, according to an embodiment.

Referring to FIG. 6, when an application requests acquisition of a particular permission of the electronic device, the electronic device may differentially provide a permission depending on the state information of the application. The electronic device may allow an application to acquire a particular permission or restrict the application from acquiring a particular permission depending on the state information of the application. The permission may imply a credential for enabling access to particular data of the electronic device or enabling performing of a particular function of the electronic device. For example, the permission may be for accessing hardware components or software components of the electronic device. For example, the state information of the application may include information relating to whether the application is in the foreground state or the background state.

In step 610, an electronic device may receive an acquisition request from an application for at least one permission.

The application may send a request for acquiring at least one permission to the electronic device. For example, a message application is required to search for a phone number of a recipient so that a message can be transmitted. Therefore, the message application may make a request for acquiring the permission enabling access to phone number data stored in the electronic device. In another example, the message application may capture a photo and attach the photo when a message is transmitted, and thus the message application may make a request for acquiring the permission for performing a camera function.

When a permission allowed when the application is installed (or downloaded) in the electronic device is initially used, the electronic device may again display a screen identifying user consent such that corresponding components of the electronic device can be accessed by the application.

In step 620, the electronic device may determine whether to allow the application to acquire the permission.

When the electronic device allows the application to acquire the permission, step 640 may be executed, and when the electronic device does not allow the application to acquire the permission, step 630 may be executed.

When the application is installed, the electronic device may determine whether to allow the application to acquire the permission. For example, when a user input for a consent icon 520 (see FIG. 5, for example) is received when the screen 510 including a list containing components usable by the application and requesting whether to agree to the use of the components is displayed, the electronic device may allow the application to acquire the permission. For example, the application that has acquired the permission may access components corresponding to the permission.

When the application is initially executed or the permission allowed for the application is initially used, the electronic device may determine whether to allow the application to acquire the permission. For example, when a user agrees that the application can acquire the permission, the electronic device may allow the application to acquire the permission, and thus the application may access the components of the electronic device corresponding to the permission.

In step 630, the electronic device may restrict the application from acquiring the permission.

The electronic device may inhibit the application from acquiring the permission. For example, the electronic device may restrict the application from acquiring the permission, and thus the installation or execution of the application may be restricted.

In step 640, the electronic device may determine whether the application is in a foreground state.

The electronic device may determine whether the application is in a foreground state or a background state.

According to an embodiment, when the application is in the foreground state, the electronic device may execute step 650, and when the application is not in the foreground state, the electronic device may execute step 660. For example, the electronic device may execute step 660 when the application is in the background state.

In step 650, the electronic device may allow the application to acquire the permission.

The electronic device may allow the application to acquire the permission to allow the application to be able to access at least one component of the electronic device corresponding to the permission.

In step 660, the electronic device may identify a permission control scheme during the background state of the application to allow or restrict the acquisition of the permission depending on the permission control scheme.

The electronic device may store a permission for accessing, by the application, hardware components or software components of the electronic device, and may predetermine a scheme controlling the permission and store the predetermined scheme. For example, the permission may be stored when the electronic device is manufactured, and may be configured and stored by a user. For example, the electronic device may pre-configure a scheme controlling a permission in consideration of the state of the application and store the predetermined scheme. The electronic device may discriminately configure a permission control scheme during the background state of the application and a permission control scheme during the foreground state of the application.

When the application is in the background state, the electronic device may allow or restrict the access to at least one component corresponding to a permission of the application according to the permission of the application, i.e. on the basis of the permission. For example, when the execution state of the application corresponds to the background, the electronic device may restrict the application from accessing hardware components or software components of the electronic device. Accordingly, the application (which operates in the background state when a user using the electronic device does not recognize the application, or regardless of the intention of a user using the electronic device) may be prevented from acquiring the permission and operating maliciously.

When the application operates in the background state, the electronic device may provide the application with a permission used in a particular activity (or an execution screen or a menu). Accordingly, the electronic device may partially restrict the permission of the application operating in the background state. For example, a permission used in a particular activity of the application may be a permission for accessing hardware components or software components of the electronic device used in the particular activity of the application. When the application operates in the background state, the electronic device may configure and store a permission control scheme enabling the application to access only at least one component usable in an activity being executed immediately before the conversion from the foreground state to the background state.

Figures 7, 8:
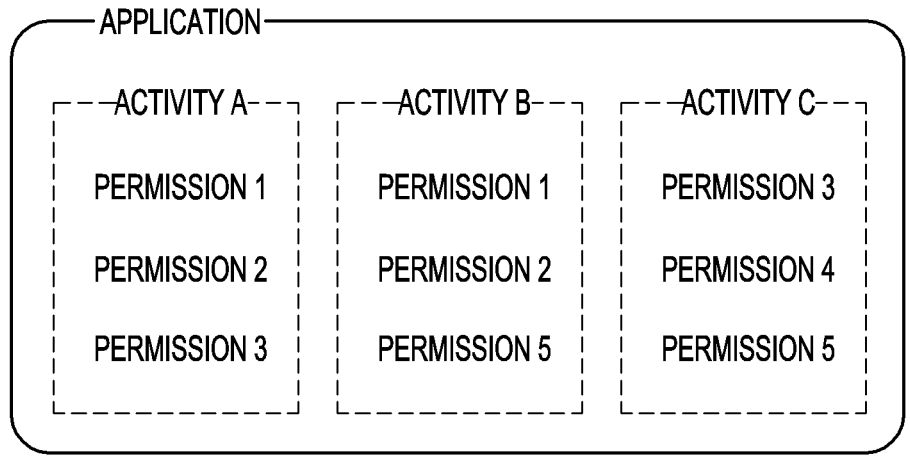
FIG. 7 is a diagram of a permission usable for each activity of an application, according to an embodiment.
FIG. 8 is a diagram of a database which has stored the level of a permission used for each activity of an application, according to an embodiment.

FIG. 7 is a diagram of a permission usable for each activity of an application, according to an embodiment. Referring to FIG. 7, the application may include permissions 1, 2, 3, 4, and 5, and the application may be configured by activities A, B, and C. Also, the application may be assumed to use permissions 1, 2, and 3 in activity A, permissions 1, 2, and 5 in activity B, and permissions 3, 4, and 5 in activity C.

The application may be configured by one or more activities, and the one or more activities may be managed to have a stack shape. For example, when the electronic device stores and manages activities executed in an application, the electronic device may store and manage the activities consecutively arranged in the shape of a stack. According to a scheme in which activities are managed in the shape of a stack, the electronic device may allow an activity, which has been executed later and thus stacked in a higher layer, to be used earlier, and may maintain user experience in the use of an application even during the movement between different applications. An activity activated on a current screen of the electronic device may be stacked at the end of the stack. For example, an activity stacked at the end may be called a top activity, and a top activity may imply an activity activated on a current screen.

When an application is configured by one or more activities and the activities are managed in the shape of a stack, as described above, when the application operates in the background state, the electronic device may allow the application to use only a permission corresponding to an activity immediately before the application is converted from the foreground state to the background state. For example, when the application operates in the background state, a permission allowance may be configured to allow the use of only a permission allowed in an uppermost activity among one or more activities of the application in a stack in which the activities of the application are stacked. The activity may be called an application top activity, and the application top activity may be an activity allowing the application, which is in the background state, to use only a permission allowed in the top activity.

When the activity of the application operating in the foreground state is activity B, the electronic device may display the screen of another application or a home screen in response to reception of a user input. Then, the electronic device may convert the state of the application that is the foreground state, to the background state. The electronic device may allow the application, the state of which has been converted to the background state, to use only permissions 1, 2, and 5 usable in activity B among all permissions of the application, the state of which has been converted to the background state.

The conventional permission control of the electronic device is not separately performed for each activity (or screen or menu). However, the electronic device performs code parsing during the installation of an application and thus can identify and manage a permission usable for each activity. For example, the electronic device may perform code parsing in the course of initially installing an application, and may identify a permission list including at least one permission used for each activity. At least one permission used for each activity may be stored in a database in a white list scheme.

FIG. 8 is a diagram of a database which has stored the level of a permission used for each activity of an application, according to an embodiment. Referring to FIG. 8, an application may include permissions 1, 2, 3, 4, and 5 and may be configured by activities A, B, and C of the application. For example, the application may use permissions 1, 2, and 3 in activity A, permissions 1, 2, and 5 in activity B, and permissions 3, 4, and 5 in activity C, and may store a permission usage for each activity.

An application using a permission may imply the application accessing and using at least one among components of the electronic device. When the electronic device executes an application, when the application is in the foreground state, all permissions allowed to the application may be used, and when the application is in the background state, the electronic device may utilize the database to allow the use of only a permission stored to be allowed in an application top activity.

An electronic device (may classify and manage permission levels of an application.

Permissions may be divided to correspond to various protection levels. For example, the electronic device may classify permissions as a normal permission and a dangerous permission.

The normal permission may include a region in which an application should access data or resources located at the outside of a sandbox (i.e., a virtual environment where new or untrusted apps can be installed and ran without letting them harm an OS) of the application, but may not include a dangerous region that may affect user personal information or the operation of another application. For example, a permission for configuring a time zone may be included in the normal permission.

The dangerous permission may include a region in which the application includes user personal information or a region requiring data or resources that may affect stored user data or the operation of another application. For example, a permission allowing reading of user's contacts may be included in the dangerous permission.

The electronic device may classify protection levels of the permissions, may allow a permission, which does not access dangerous data, to be used in the background state, and may prevent a permission, which accesses dangerous data, from being used in the background state. The electronic device may configure a black list and, when the application is in the background state, perform management to restrict an access to a permission included in the black list.

The electronic device may pre-configure a permission that cannot be used in the background state and, when the corresponding permission is to be used in the background state, restrict the use of the corresponding permission.

The manufacturer of the electronic device (or application) may determine the configuration of a permission that cannot be used in the background state and build a database using the permission, and the permission may be configured at a time point at which a user uses the application. When the application is in the foreground state, the use of the permission may be allowed in order to freely access a camera function of the application. However, when the application is in the background state, the use of the permission may be restricted to restrict the access to the camera function.

The electronic devices described herein may manage the combination of permissions of an application.

In relation to a particular permission, using the particular permission together with another permission may be more dangerous than using the particular permission solely. For example, a permission for acquiring location information may have a high possibility of being abused when location information acquired by using the corresponding permission is transmitted to another application, compared to the dangerousness of itself. Therefore, when it is determined that the combination of a particular permission is dangerous, the electronic device may restrict the combination of the corresponding permission when the application is in the background state. For example, the electronic device may restrict the combination of at least two permissions. When the application attempts to use a first permission and a second permission together, the electronic device may prevent the application from using one of those permissions.

The electronic devices described herein may invalidate data that the application in the background state accesses.

When an application in the background state attempts to access particular data, the electronic device may provide the application with configuration data of a user, random data fixed in the electronic device, or random data randomly produced by the electronic device, instead of any particular data. Accordingly, the electronic device may protect personal information of a user, thereby ensuring a user that their personal information will not be leaked.

When the application is in the background state, when the application tries to access particular data, the electronic device may allow the application to access abnormal data. For example, when the application is in the background state, when the application tries to access particular data and use (e.g. read/write/share) the particular data, the electronic device may provide meaningless data instead of the particular data. For example, the electronic device may provide particular data based on a configuration of a user or provide data randomly produced in the electronic device. Therefore, when the application operates in the background state, the electronic device may allow the application to randomly access produced data as described above, instead of accessing actual data. Accordingly, the electronic device may prevent the misuse/abuse of data of the application.

When the application is in the foreground state, when the application tries to access particular data, the electronic device may allow the application to normally access the data. For example, the electronic device may allow the application to access normal data normally collected by the electronic device and use the corresponding data.

When the application is in the background state, when the application tries to access particular data, the electronic device may determine an operation that a user does not agree to, as the operation of the application. Therefore, the electronic device may change the particular data to be accessed by the application into a random value to prevent the application from accessing actual data.

The electronic device may configure contacts, call logs, text messages, location, and/or a file store, as data restricted (protected) from access by the application when the application is in the background state, and may differently configure a scheme restricting the access to the data (or a scheme protecting the data) depending on the type of the data. For example, data including contacts, call logs, and/or text messages can be stored in the database type. Therefore, the application may access data by using a cursor for searching each database. The electronic device may provide the application operating in the background state with predetermined random database in order to protect the data, thereby preventing the application from accessing the data. For example, in the case of data, such as location data, the value of which is acquired by a real time request, the electronic device may transfer a random value to the application operating in the background state in real time, thereby restricting the application from accessing normal data.

The electronic devices described herein may differently provide a function of an application.

The electronic device may differently configure a function of the application when the application is in the foreground state and the background state. For example, the electronic device may restrict the execution of some functions in the background state of the application. The electronic device may differently configure a function in the foreground state and a function in the background state while providing the same permission regardless of whether the state of the application corresponds to the foreground state or the background state. For example, when the application is in the foreground state, all functions related to a camera are usable. However, when the execution of a camera is requested when the application is in the background state, the electronic device may provide low quality photographing of the camera.

The electronic device may configure a security level for data produced as a result according to the execution of the application in the background state, and thus the electronic device may differently provide a security level to the data produced by the application depending on the operation state (the foreground state or the background state) of the corresponding application. For example, the electronic device may configure a password for a file produced by the operation of the application in the background state. The electronic device may allow the application to execute the same function regardless of whether the state of the application corresponds to a foreground state or a background state. However, the electronic device may perform security configuration to ask a user for additional authentication for data produced by the execution of the application in the background state. When the application is in the foreground state, the application may freely use a camera function. However, when the application is in the background state, when a photo captured using a camera function is stored, the photo may be stored as a security file.

The electronic devices described herein may differently configure a permission depending on the state of the application.

The electronic device may allow a user to separately configure a permission for each state of the application (e.g. the foreground state and background state of the application).

In conventional methods, a permission of an application, which is allowed or blocked at a time point of the installation or execution of the application, has been managed through the same policy regardless of the state of the application. However, in accordance with the disclosure, the electronic device may differently manage various permissions of the application depending on the state of the application. For example, in order to prevent the misuse/abuse of a permission used in the background state of the application, when a permission allowed to be used at a time point of the installation of the application is used in the background state of the application, the electronic device may notify a user through a scheme of providing the user with a notification to prevent the misuse/abuse of the permission.

The electronic device may present a list of permissions allowed by a user during the installation (or downloading) of an application and information relating to which permission the corresponding application is using, and may allow the user to configure a permission to be used in the background state of the application.

FIGS. 9A-9C are diagrams of a user interface through which an electronic device is configured to allow an application to provide a user with a notification, according to an embodiment.

The electronic device may display an application list 903 of the electronic device, as shown in FIG. 9A. The electronic device may display a list of applications downloaded and installed in the electronic device. The application list 903 may include a button 901 allowing a user to configure whether to provide a notification for the use of a permission for accessing hardware components or software components of the electronic device while each application is executed in the background state.

Referring to FIG. 9A, in a default configuration state, all applications of the list may be configured to provide a notification for a permission used in the background state. For example, the configuration button 901 has been previously turned on, and the state of the button may be turned off or turned on depending on a user input.

When a user input 907 for selecting one application 905 in the application list 903 is received, the electronic device may display on the screen a list 909 of permissions which are allowed by a user to access the hardware components or software components of the electronic device at a time point at which the application 905 is installed or executed, as shown in FIG. 9B.

In the permission list 909, the electronic device may configure whether to execute a notification for notifying that the application 905 uses a permission when operating in the background state. Referring to FIG. 9B, each of permissions in the permission list 909 may include a button 911 allowing the configuration of whether to execute the notification. For example, a permission, in which the execution of a notification has been turned off among the permissions in the permission list 909, has been configured because it has been determined that the permission is safe to be used even when the corresponding application is in both of the foreground state and the background state. Therefore, the electronic device may not provide a separate notification even when the permission is used in the background state. When a permission, in which the execution of a notification is turned on among the permissions in the permission list 909, is used when the application is in the background state, the electronic device may provide a notification. For example, in FIG. 9B, the configuration buttons 911 of the permissions, such as an SMS, a CAMERA, a MICROPHONE requiring a comparatively high level of security, may be in a turn-on state as a default value and, when the permissions are used in the background state of the application, the electronic device may provide a user with a notification. As a default configuration, the configuration buttons 911 of remaining permissions may be in a turn-off state so as not to provide a notification. For example, the state (on/off) of the configuration button 911 may be configured to be changed depending on a user input.

The electronic device may configure whether to allow the use of the permission, together with whether to allow the execution of the notification. The configuration button 911 may configure whether to allow the use of the permission in the background state, together with whether to allow the execution of the notification, for each of the permissions of the permission list 909. For example, when a configuration button 911 of a particular permission is in the turn-on state, the particular permission can be used in the background state and a notification may be provided when the particular permission is used in the background state. When a configuration button 911 of a particular permission is in a turn-off state, the corresponding permission may be restricted from being used in the background state.

The electronic device may provide a history, in which, when an application is in the background state, the application has used hardware components or software components of the electronic device within a designated period, i.e. a record in which the application has used a permission accessing the components.

Referring back to FIG. 9A, the electronic device may display a button 913 allowing identifying a permission usage record. For example, the button 913 may be activated when there is a record in which the application has used a permission in the background state.

The button 913 may be activated when there is a record in which a particular permission having turned-on button 911 of the permission list 909 of FIG. 9B has been used in the background state of the application. When a user input for the button 913 is received, the electronic device may display a screen including a list of permissions used when the application is in the background state, as shown in FIG. 9C. For example, the electronic device may provide, as a usage permission list (or also referred to as a permission usage record), a usage history in which a turned-on permission of the application has been used in the background state, as illustrated in FIG. 9B.

Referring back to FIG. 9C, the electronic device may display an application name and a name of a permission used in the corresponding application, together with a date on which the permission is used, and information relating thereto. With reference to the screen displayed in FIG. 9C, a user may identify that an unnecessary permission has been used in the background state.

A particular permission among permissions including in a list of permissions used when the application is in the background state may be displayed to be distinguishable from another permission by applying a shadow effect, a designated color, a font, and/or a text size. The particular permission may be automatically determined by the electronic device depending on a predetermined permission level (e.g., a priority), or may be determined by the selection of a user. For example, when a permission (which is predetermined such that it will be dangerous when the permission is used when the application is in the background state) is used when the application is in the background state, the electronic device may apply a predetermined visual effect to a usage history of the permission and display the visual effect-applied history on the permission list.

The electronic device may arrange permission usage records according to dates and display the arranged records (FIG. 9C).

The electronic device may arrange histories of a permission used when the application is in the background state, depending on importance (e.g. importance established by a user considering the configuration, frequency of use, and/or predetermined personal information security importance, etc.), and display the arranged histories.

The electronic device may arrange histories, in which a permission is used when the application is in the background state, for each permission (e.g. SMS, CAMERA, MICROPHONE) and display the arranged histories.

Figure 10A:
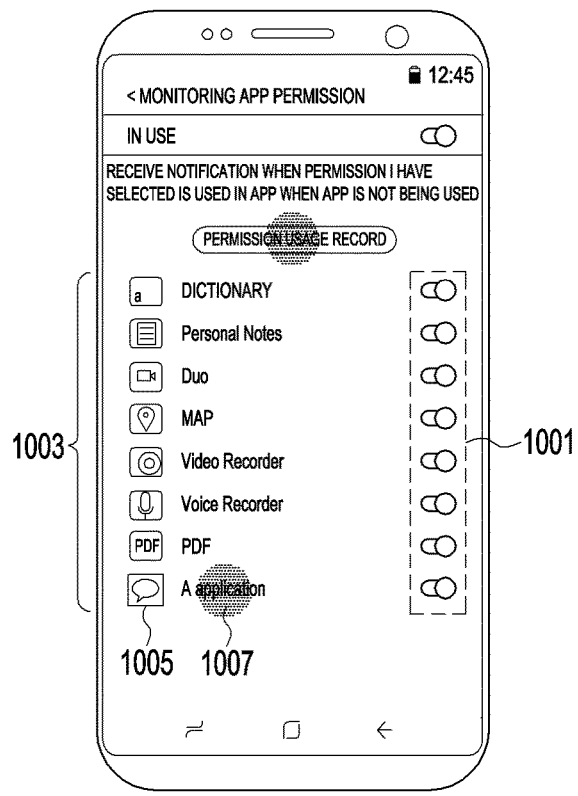
FIGS. 10A and 10B are diagrams of a user interface through which an electronic device is configured to provide a user with a notification when the use of a particular permission of an application is detected, according to an embodiment.
Figure 10B:
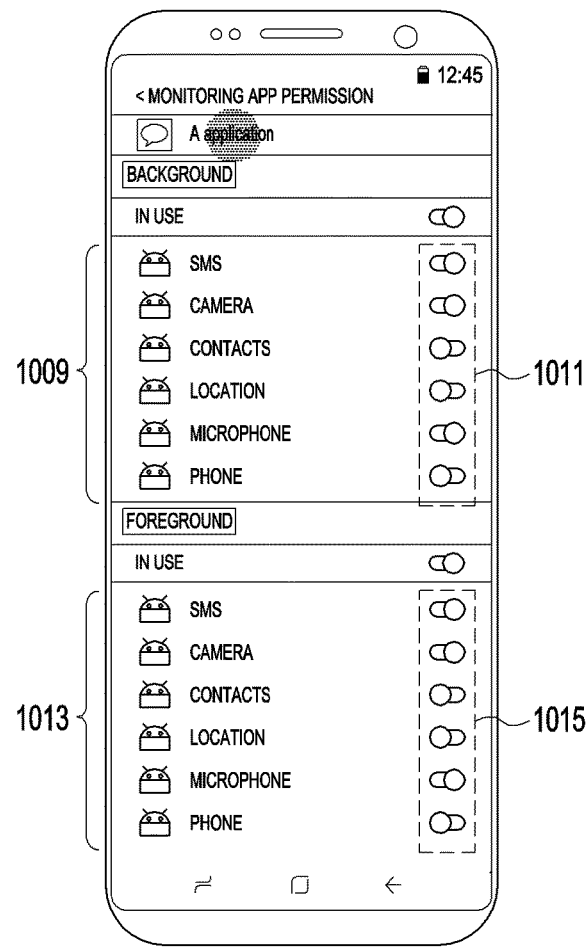

FIGS. 10A and 10B are diagrams of a user interface through which an electronic device is configured to provide a user with a notification when the use of a particular permission of an application is detected, according to an embodiment. The electronic device may display an application list 1003 of the electronic device, as shown in FIG. 10A.

The application list 1003 may include a button 1001 configured to turn on/off whether to execute a notification notifying that an application uses a designated permission when each of the applications operates. For example, the designated permission may be a permission in the foreground state, which is configured to allow a notification to be executed, and/or a permission in the background state, which is configured to allow a notification to be executed for each of applications, as shown in the screen of FIG. 10B.

When a user input 1007 for selecting one application 1005 in the application list 1003 is received, the electronic device may display a screen including lists 1009 and 1013 including permissions, the use of which has been requested by the application 1005 to a user at a time point when the application 1005 is installed or executed FIG. 10B.

The electronic device may display the permission list 1009 when the application is in the background state and the permission list 1013 of the case when the application is in the foreground state, to be distinguishable from each other.

The electronic device may configure whether to execute a notification for notifying that a permission is used when the application 1005 operates in the background state.

Each of permissions in the permission list 1009 may include a configuration button 1011 to be turned on/off, thereby allowing execution of the notification. For example, a permission, the notification of which has been turned off among the permissions in the permission list 1009, is determined to be safe to and used when the application is in the background state. Therefore, the electronic device may not provide a separate notification when the permission is used in the background state. For example, when a permission having a turned-on notification among the permissions in the permission list 1009, when the permission is used when the application is in the background state, the electronic device may provide a notification notifying that the permission has been used in the background state.

The electronic device may configure whether to execute a notification for notifying that a permission is used, when the application 1005 operates in the foreground state, in the permission list 1013 of the case of the foreground state. Each of the permissions in the permission list 1013 may include a configuration button 1015, for configuring execution of the notification, to be in a turn-on/off state. For example, a permission, the notification of which has been turned off among the permissions in the permission list 1013, is determined to be safe and to be used when the application is in the foreground state. Therefore, the electronic device may not provide a separate notification when the permission is used in the foreground state. when a permission having a turned-on notification among the permissions in the permission list 1013, when the permission is used when the application is in the foreground state, the electronic device may provide a notification notifying that the permission has been used in the foreground state.

The electronic device may configure whether to allow the use of the permission, together with whether to allow the execution of the notification for each of the permissions in the permission lists 1009 and 1013. For example, when a configuration button 1011 of a particular permission is configured to be in a turn-on state, the particular permission may be usable in the background state, and a notification may be provided when the particular permission is used in the background state. When the configuration button 1011 of a particular permission is in a turn-off state, the corresponding permission may be restricted from being used in the background state. When a configuration button 1015 of a particular permission is configured to be in a turn-on state, the particular permission may be usable in the foreground state, and a notification may be provided when the particular permission is used in the foreground state. When the configuration button 1013 of a particular permission is in a turn-off state, the corresponding permission may be restricted from being used in the foreground state.

Figure 11:
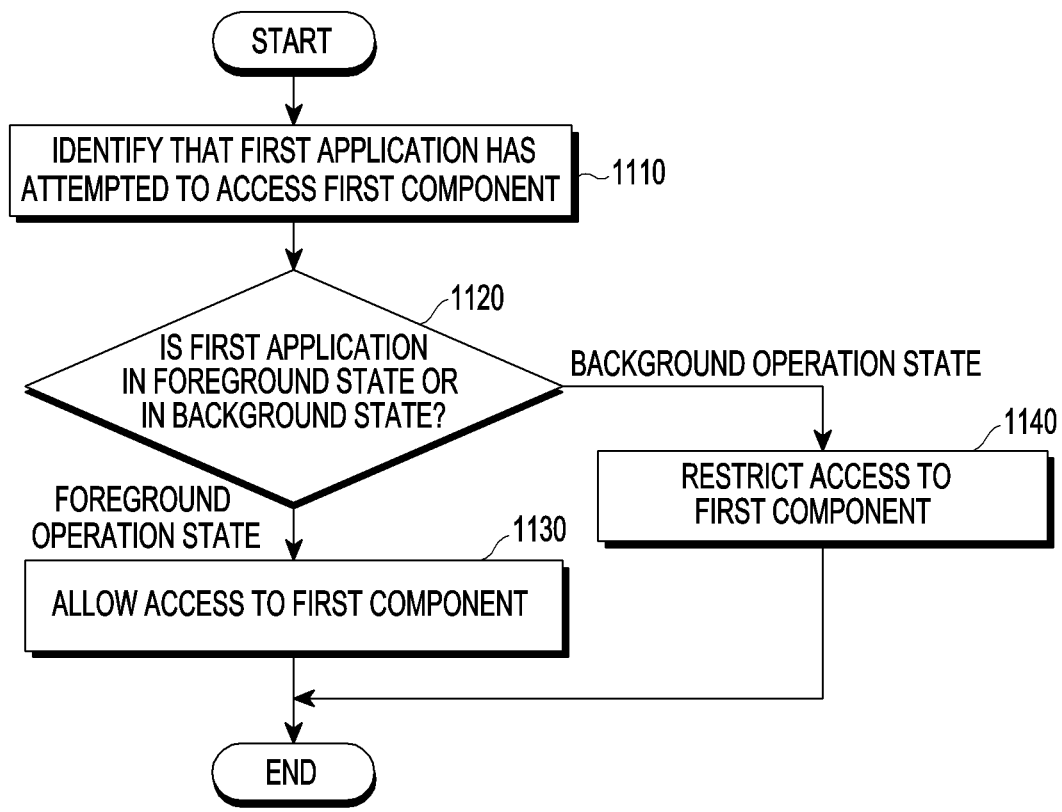
FIG. 11 is a flowchart of a method for controlling an application of an electronic device that accesses a component of the electronic device, according to an embodiment.

FIG. 11 is a flowchart of a method for controlling that an application of an electronic device accesses a component of the electronic device, according to an embodiment.

Referring to FIG. 11, when the application attempts to access hardware components or software components of the electronic device, the electronic device may control the access of the application to the component, based on the state information of the application.

When a first application is installed (or downloaded) or initially executed, the electronic device may determine whether to allow the first application to acquire a first permission. For example, the first permission may be a permission allowing the first application to access a first component. When a user allows the first application to acquire the first permission, the electronic device may store the first permission.

The electronic device may determine whether to allow or restrict the use of the first permission by the first application, depending on the state information of the first application, and may store the determined result. The state information may include information relating to whether the first application is in the foreground state or the background state. The electronic device may allow the first application to use the first permission when the first application is in the foreground state. When the first permission corresponds to the access of the first application to the first component, when the first application is in the foreground state, the electronic device may access the first component. When the first application is in the background state, the electronic device may not allow the first application to use the first permission. When the first permission corresponds to the access of the first application to the first component, when the first application is in the background state, the electronic device may restrict the first application from accessing the first component.

In state 1110, an electronic device may identify the attempt from the first application to access the first component.

The first component may be particular data of the electronic device or a particular function (e.g. particular application) of the electronic device.

In step 1120, the electronic device may determine whether the first application is in a foreground state or background state.

When the first application is in the foreground state, the electronic device may execute step 1130, and when the first application is in the background state, the electronic device may execute step 1140.

In step 1130, the electronic device may allow the access of the first application to the first component.

It may be predetermined for the first application to be allowed to access the first component when the first application is in the foreground state. For example, it may be predetermined for the first application to be allowed to use a first permission when the first application is in the foreground state.

The electronic device may access the first component to acquire data stored in the first component or execute a particular function of the first component.

In step 1140, the electronic device) may restrict the access of the first application to the first component.

When the first application is in the background state, it may be predetermined for the first application to be restricted from accessing the first component. For example, it may be predetermined for the first application to be restricted from using the first permission when the first application is in the background state.

Figure 12:
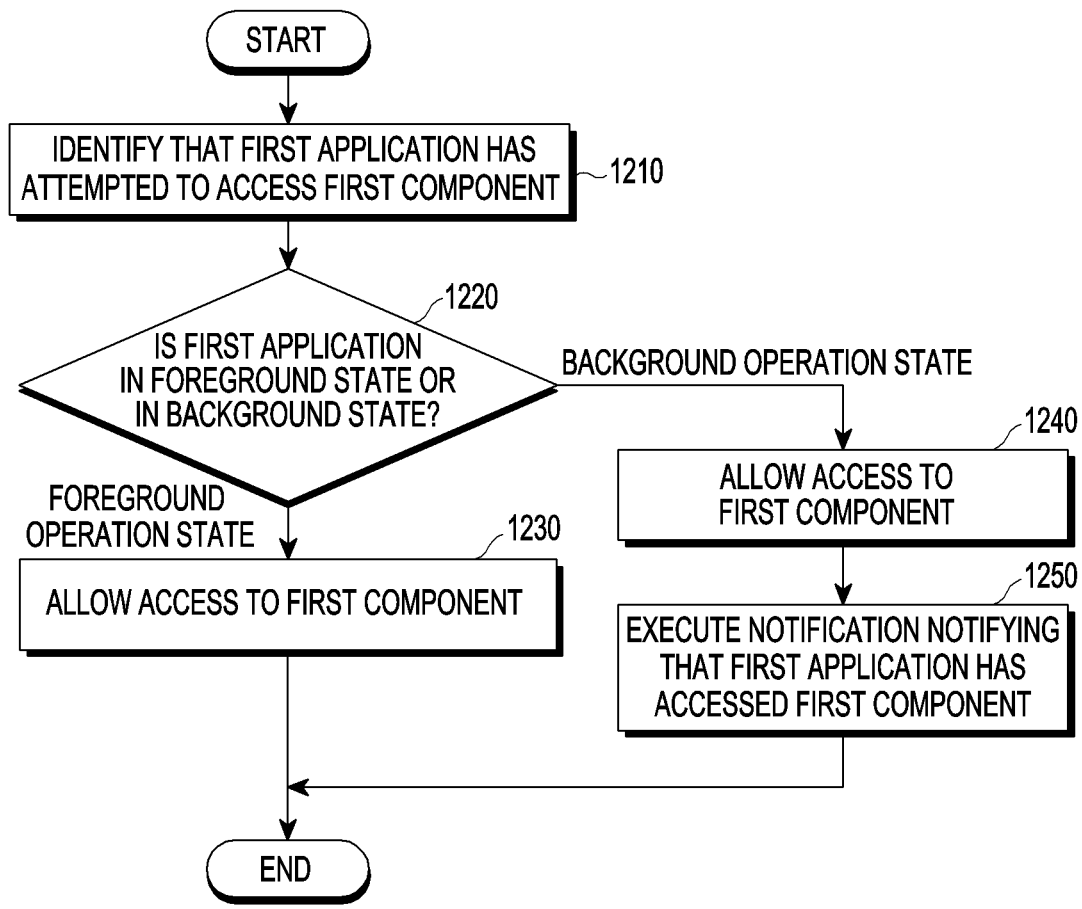
FIG. 12 is a flowchart of a method for controlling an application of an electronic device that accesses a component of the electronic device, and providing a notification thereof, according to an embodiment.

FIG. 12 is a flowchart of a method for controlling that an application of an electronic device accesses a component of the electronic device, and providing a notification thereof, according to an embodiment. Referring to FIG. 12, when an application uses hardware components or software components of the electronic device in the background state, the electronic device may provide a user with a notification notifying that the application has used the component in the background state.

In step 1210, the electronic device may identify the attempt from the first application to access the first component.

The first component may be particular data of the electronic device or a particular function (e.g. particular application) of the electronic device.

In step 1220, the electronic device may determine whether the first application is in a foreground state or background state.

When the first application is in the foreground state, the electronic device may execute step 1230, and when the first application is in the background state, the electronic device may execute step 1240.

In step 1230, the electronic device may allow the access of the first application to the first component.

When the first application is in the foreground state, it may be predetermined for the first application to be allowed to access the first component. For example, it may be predetermined for the first application to be allowed to use a first permission when the first application is in the foreground state.

The electronic device may access the first component to acquire data stored in the first component or execute a particular function of the first component.

In step 1240, the electronic device may allow the access to the first component.

It may be predetermined for the first application to be allowed to access the first component when the first application is in the background state. For example, it may be predetermined for the first application to be allowed to use the first permission when the first application is in the background state.

The electronic device may access the first component to acquire data stored in the first component or execute a first particular function.

In step 1250, the electronic device may execute a notification notifying that the first application has accessed the first component.

The electronic device may execute a notification notifying that the first application, which is in the background state, has accessed the first component. The notification may be implemented by various schemes, such as displaying on a screen of the electronic device, the vibration of the electronic device, and/or the outputting through a speaker of the electronic device.

The electronic device may transmit the notification to at least one external electronic device connected to the electronic device and, thus, the notification may be executed in the external device.

When the first application, which is in the background state, attempts to access the first component, the electronic device may allow the access of the first application to the first component and execute a notification notifying that the first application has accessed the first component.

When the first application, which is in the background state, attempts to access the first component, the electronic device may restrict the access of the first application to the first component and execute a notification notifying that the first application, which is in the background state, has attempted to access the first component.

When the first application, which is in the background state, attempts to access the first component, the electronic device may notify that the first application, which is in the background state, has attempted to access the first component, and may request user consent about whether to allow the access of the first application to the first component. When the first application, which is in the background state, attempts to access the first component, the electronic device may notify that the first application, which is in the background state, has attempted to access the first component, and may display a screen requesting consent about whether to allow the access of the first application to the first component. When a user makes an input for agreeing that the first application is allowed to access the first component, the electronic device may allow the first application to access the first component.

Figure 13:
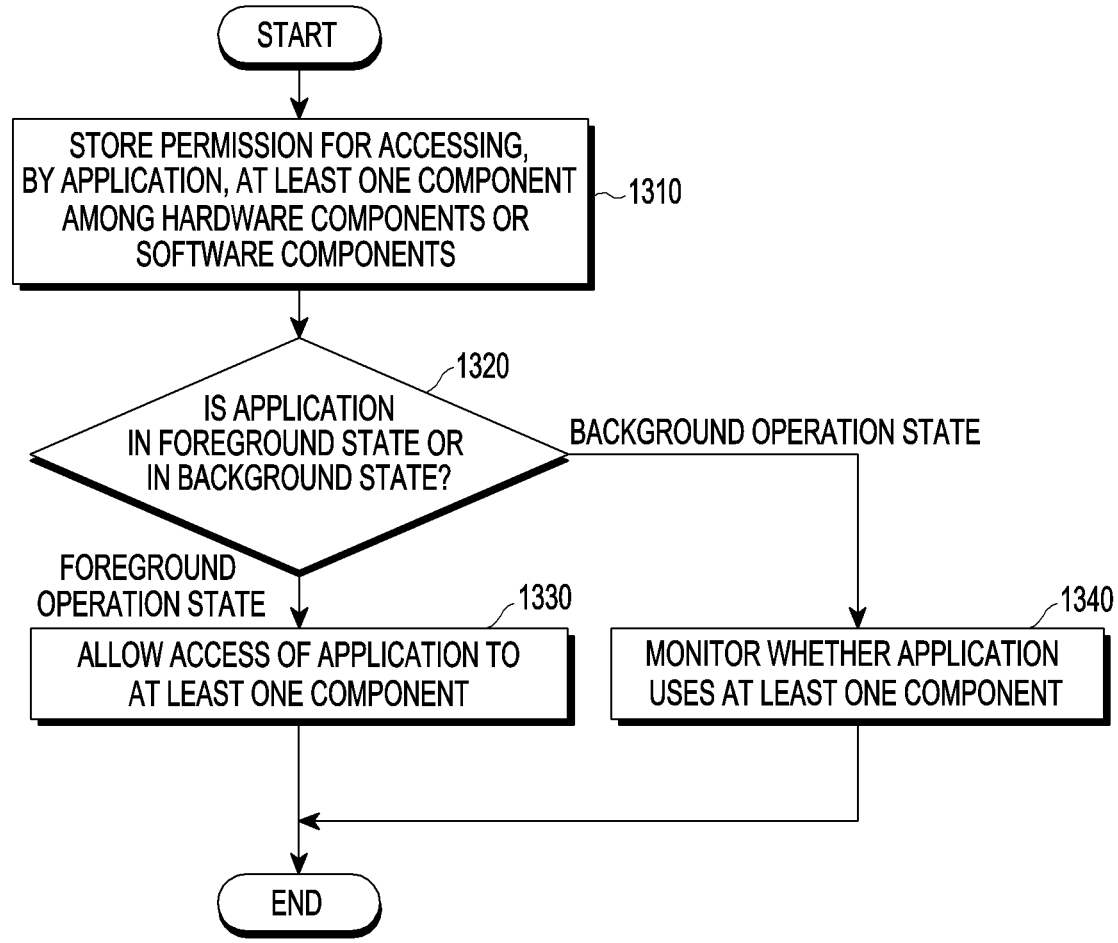
FIG. 13 is a flowchart of a method of an electronic device depending on the state information of an application, according to an embodiment.

FIG. 13 is a flowchart of a method of an electronic device depending on the state information of an application, according to an embodiment.

Referring to FIG. 13, the electronic device may monitor whether an application uses at least one component of the electronic device when the application is in the background state.

In step 1310, an electronic device may store a permission for accessing, by an application, hardware components or software components of the electronic device.

The electronic device may store the permission when the application is installed (or downloaded) or executed.

In step 1320, the electronic device may determine whether the application is in a foreground state or a background state.

When the application is in the foreground state, the electronic device may execute step 1330, and when the application is in the background state, the electronic device may execute step 1340.

When the application is in the foreground state, a user interface of the application may be displayed on a display of the electronic device.

When the application is in the background state, at least a part of a user interface of the application may be hidden in a display of the electronic device.

In step 1330, the electronic device may allow the access of the application to at least one component.

When the application attempts to access the at least one component, the electronic device may allow the access on the basis of the stored permission.

In step 1340, the electronic device) may monitor whether the application uses the at least one component.

The electronic device may store a history in which the application has used the at least one component in the background state, based on a result from the monitoring.

The methods and electronic devices described herein are configured for controlling a permission of an application, and the permission may be provided differentially while the application is executed in the foreground state and the background of the electronic devices.

The methods and electronic devices described herein are configured for controlling the permission of an application, and a result produced by executing another function that a user does not intend to perform when the application is executed in the background state of the electronic device can be invalidated, or the result can be identified through additional authentication of the user, so that various types of data of the electronic device can be protected.

Based on a result from the monitoring, the electronic device may provide a user with a notification when the application has used the at least one component in the background state. For example, whether to provide the notification may be configured by a user. The notification may be implemented by various schemes, such as displaying the notification on a screen of the electronic device, a vibration of the electronic device, and/or outputting the notification through a speaker of the electronic device.

A method for controlling a permission of an application program (e.g. the application 146) of an electronic device (e.g. the electronic device 101 or the processor 120 of the electronic device 101) may include: storing a permission (permission) for accessing, by the application program, at least one among hardware components or software components of the electronic device; activating the application program; allowing the application program to access the at least one among the hardware components or software components on the basis of the permission and displaying a user interface of the application program on a touchscreen display (e.g. the display device 160); hiding at least a part of the user interface while the application program is executed in the background state; and monitoring whether the application program uses the at least one among the hardware components or software components while the application program is executed in the background state.

The method may further include providing the touchscreen display with a notification when the application program uses at least one among the hardware components or the software components while the application program is executed in the background state.

The method may further include providing the touchscreen display with a configuration User Interface (UI) for configuration, and the configuration user interface may include a list of application programs each having at least one button selecting whether the notification is provided.

The configuration user interface may further include a button configured to provide a history in which the application program uses at least one among the hardware components or the software components within a designated period while the application program is executed in the background state, and the method may further include providing the touchscreen display with the history when a user input for the button is received.

A user input may be received through the list of the application programs, and the method may include displaying, when a user input for at least one among the application programs in the list is received, a list of the hardware components or the software components each including at least one button enabling the selection of the permission.

In a machine-readable storage medium, in which a program for executing a method for controlling a permission of an application program (e.g. the application 146) of an electronic device (e.g. the electronic device 101 or the processor 120 of the electronic device 101) is recorded, the method may include: storing a permission for accessing, by the application program, at least one among hardware components or software components of the electronic device; activating the application program; allowing the application program to access the at least one among the hardware components or software components on the basis of the permission and displaying a user interface of the application program on a touchscreen display (e.g. the display device 160); hiding at least a part of the user interface while the application program is executed in the background state; and monitoring whether the application program uses the at least one among the hardware components or software components while the application program is executed in the background state.

The methods and electronic devices disclosed herein may be implemented by software including an instruction stored in a non-transitory computer-readable storage media. The non-transitory computer-readable storage media can be a device that calls the stored instruction from the storage media and can operate according to the called instruction. The command, when executed by a processor, may cause the processor to directly execute a function corresponding to the command or cause other elements to execute the function under the control of the processor. The command may include a code that is generated or executed by a compiler or interpreter. Herein, the term non-transitory is defined as a storage media that is tangible without including a signal, irrespective of whether data is semi-permanently or stored in the storage media.

A method disclosed herein may be provided when the method is included in a computer program product. The computer program product can be merchandise which can be traded between a seller and a buyer. The computer program product may be distributed in a type of machine-readable storage media (e.g. a CD-ROM), or may be distributed through an application store (e.g. the play Store™) to the online. In a case of online distribution, at least a part of the computer program product may be temporarily produced or at least transitorily stored in storage media, such as a memory of an intermediate server, a server of the application store, or a server of the manufacturer.

Each of the elements (e.g. module or program) described herein may be configured by a single or multiple entities, and some sub-elements among the above described sub-elements may be omitted, or other sub-elements may be further included in the various embodiments. Alternatively or additionally, some elements (e.g. module or program) may be integrated into a single entity and may perform identically or similarly the functions performed by the respective corresponding elements before being integrated. Operations performed by a module, a program, or other elements may be executed sequentially, in parallel, repeatedly, or in a heuristic manner. At least some operations may be executed according to another sequence, may be omitted, or may further include other operations.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. An electronic device comprising:
a housing;
a touchscreen display;
a wireless communication circuit;
a processor electrically connected to the touchscreen display and the wireless communication circuit; and
a memory electrically connected to the processor, wherein the memory is configured to store an application program comprising a user interface, and store an instruction that, when executed, enables the processor to:
store a permission for accessing, by an application program stored in the memory, at least one among hardware components or software components of the electronic device according to a background state or a foreground state of the application program;
classify the permission to correspond to at least one of a normal permission and a dangerous permission based on the at least one among the hardware components or the software components to which the permission allows access;
receive an access request for the hardware or software components;
operate a first activity of the application program while the application program is in the foreground state;
convert the application program from the foreground state to the background state while the first activity is being operated;
identify an acquisition request from the application program for the permission;
based on identifying that the application program is executed in the background state, the permission is classified as the dangerous permission, and the permission is not used for the first activity, prevent the application program from using the permission; and
based on identifying that the application program is executed in the background state, the permission is classified as the dangerous permission, and the permission is used for the first activity, allow use of the permission to access the at least one hardware components or software components.

2. The electronic device of claim 1, wherein the memory stores an instruction that, when executed, enables the processor to provide, through the touchscreen display, a notification when the application program uses the at least one among hardware components or software components while the application program is executed in the background state.

3. The electronic device of claim 2, wherein the memory stores an instruction that, when executed, enables the processor to provide a configuration UI to the touchscreen display, and
wherein the configuration UI comprises a list of application programs each having at least one button configured to select whether the notification is provided.

4. The electronic device of claim 3, wherein the configuration UI further comprises a button configured to provide a history in which the application program uses the at least one among hardware components or software components within a designated period while the application program is executed in the background state, and
wherein the memory stores an instruction that, when executed, enables the processor to, when a user input for the button that is configured to provide the history is received, provide the history on the touchscreen display.

5. The electronic device of claim 3, wherein when a user input for an application program among the list of application programs is received, a list of the at least one among hardware components or software components comprising at least one button enabling the selection of the permission is displayed.

6. The electronic device of claim 2, wherein the memory stores an instruction that, when executed, enables the processor to transmit the notification to an external electronic device by using the wireless communication circuit.

7. The electronic device of claim 1, wherein the memory stores an instruction that, when executed, enables the processor to, when the application program is one of installed and executed, store the permission.

8. The electronic device of claim 1, wherein the memory stores an instruction that, when executed, enables the processor to, when at least two components among the at least one among hardware components or software components of the electronic device operate in association with each other, restrict the application program from accessing one of the at least two components among the one of hardware components and software components of the electronic device while the application program is executed in the background state.

9. The electronic device of claim 1, wherein the memory stores an instruction that, when executed, enables the processor to provide the application program with one of predetermined data and randomly generated data when the application program accesses the at least one among hardware components or software components while the application program is executed in the background state.

10. The electronic device of claim 1, wherein the memory further stores a function provided when the application program is executed in the foreground state and a function provided when the application program is executed in the background state.

11. A method for controlling a permission of an application program of an electronic device, the method comprising:
storing a permission for accessing, by the application program, at least one among hardware components or software components of the electronic device according to a background state or a foreground state of the application program;
classifying the permission to correspond to at least one of a normal permission and a dangerous permission based on the at least one among the hardware components or the software components to which the permission allows access;
receiving an access request for the hardware or software components;
operating a first activity of the application program while the application program is in the foreground state;
converting the application program from the foreground state to the background state while the first activity is being operated;
identifying an acquisition request from the application program for the permission;
based on identifying that the application program is executed in the background state, the permission is classified as the dangerous permission, and the permission is not used for the first activity, preventing the application program from using the permission; and
based on identifying that the application program is executed in the background state, the permission is classified as the dangerous permission, and the permission is used for the first activity, allowing use of the permission to access the at least one hardware components or software components.

12. The method of claim 11, further comprising: providing the touchscreen display with a notification when the application program uses the at least one among the hardware components or software components while the application program is executed in the background state.

13. The method of claim 12, further comprising: providing a configuration UI to the touchscreen display, wherein the configuration UI comprises a list of application programs each having at least one button configured to select whether the notification is provided.

14. The method of claim 13, further comprising:
wherein the configuration UI further comprises a button configured to provide a history in which the application program uses the at least one among hardware components or software components within a designated period while the application program is executed in the background state, and
providing the history on the touchscreen display when a user input for the button is received.

15. The method of claim 12, further comprising: when a user input for one application program of the list of application programs is received, displaying a list of at least one among hardware components or software components each comprising at least one button enabling the selection of the permission.

16. A non-transitory computer readable storage medium including a plurality of instructions that when executed perform a method for controlling a permission of an application program of an electronic device, the method comprising:
storing a permission for accessing, by the application program, at least one among hardware components or software components of the electronic device according to a background state or a foreground state of the application program;
classifying the permission to correspond to at least one of a normal permission and a dangerous permission based on the at least one among the hardware components or the software components to which the permission allows access;
receiving an access request for the hardware or software components;
operating a first activity of the application program while the application program is in the foreground state;
converting the application program from the foreground state to the background state while the first activity is being operated;
identifying an acquisition request from the application program for the permission;
based on identifying that the application program is executed in the background state, the permission is classified as the dangerous permission, and the permission is not used for the first activity, preventing the application program from using the permission; and
based on identifying that the application program is executed in the background state, the permission is classified as the dangerous permission, and the permission is used for the first activity, allowing use of the permission to access the at least one hardware components or software components.

* * * * *